United States Patent [19]

Torimoto

[11] Patent Number: 4,720,646
[45] Date of Patent: Jan. 19, 1988

[54] CONNECTION TERMINAL ASSEMBLY FOR STATOR COIL

[75] Inventor: Koichi Torimoto, Himeji, Japan

[73] Assignee: Mitsubishi Denki Kabushiki Kaisha, Tokyo, Japan

[21] Appl. No.: 933,513

[22] Filed: Nov. 21, 1986

[30] Foreign Application Priority Data

Dec. 3, 1985 [JP] Japan ............................ 60-186581[U]

[51] Int. Cl.4 .............................................. H02K 5/04
[52] U.S. Cl. ...................................... 310/71; 310/194; 310/259
[58] Field of Search ................. 310/43, 45, 71, 89, 310/194, 208, 259, 263; 336/192; 339/218 R, 218 M

[56] References Cited

U.S. PATENT DOCUMENTS

| | | | |
|---|---|---|---|
| 3,131,331 | 4/1964 | Ray | 336/192 |
| 3,359,520 | 12/1967 | Foerster | 336/192 |
| 3,496,504 | 2/1970 | Daley | 336/192 |
| 3,663,914 | 5/1972 | Lane | 336/192 |
| 4,590,398 | 5/1986 | Nagamatsu | 310/71 |

*Primary Examiner*—Patrick R. Salce
*Assistant Examiner*—D. L. Rebsch
*Attorney, Agent, or Firm*—Sughrue, Mion, Zinn, Macpeak and Seas

[57] ABSTRACT

The opposite end flanges 1d, 1e of a stator bobbin are provided with apertures 1a, 1b and clamping recesses 1c to firmly retain push-inserted terminal plates 3 and lead wires 4 during encapsulation by a molding resin 5. The retention of the terminal plate ends is implemented by spring flukes 3c snapping into engagement with flange apertures 1b during insertion.

4 Claims, 8 Drawing Figures

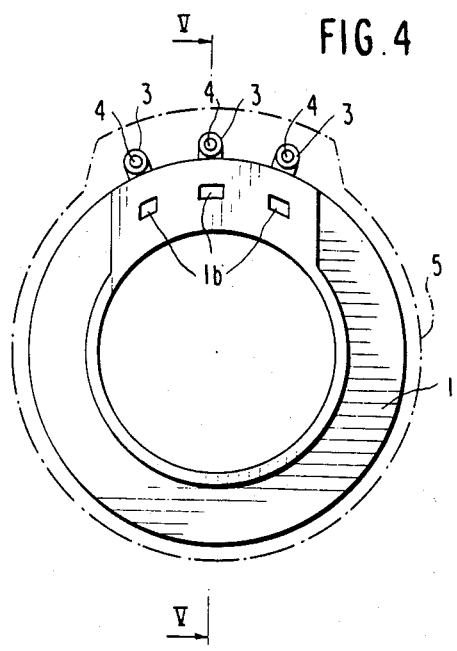
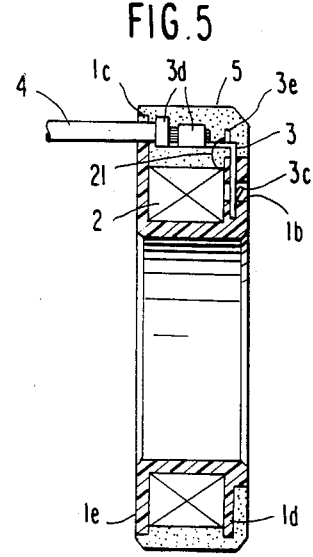
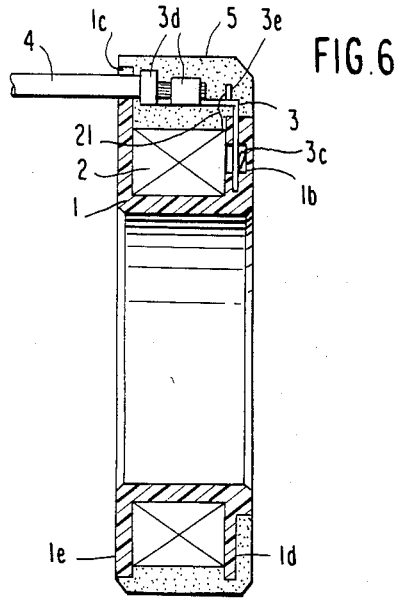
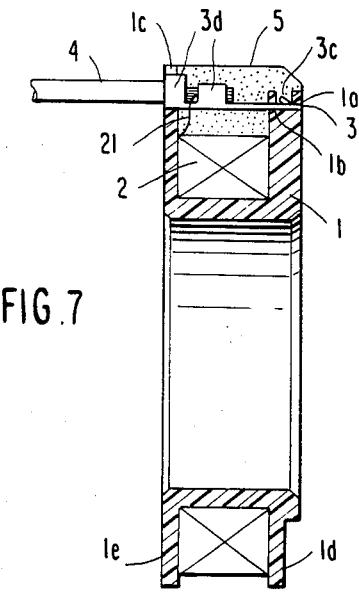
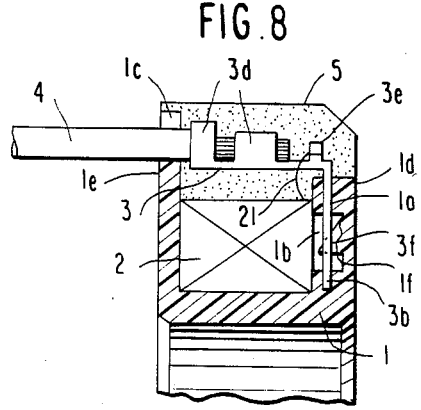

CONNECTION TERMINAL ASSEMBLY FOR STATOR COIL

BACKGROUND OF THE INVENTION

This invention relates to a connection terminal assembly for the stator coil of a motor.

FIGS. 1 and 2 show exploded and assembled perspective views of a conventional connection terminal assembly for the stator coil of a stepping motor, as disclosed in Japanese Utility Model Publication No. 116855/81, wherein the flanges 11 and 12 on the opposite ends of a bobbin 20 are provided with arcuate notches or recesses 13, 14 to accommodate the mounting of a terminal holder 30. The holder is equipped with terminal clips 31, 32 which are respectively connected to lead wires 6, 7 and the ends 21, 22 of the stator coil during assembly as shown in FIG. 2. The assembly is completed by the stator core cup 40 and cover 50 provided with meshing or interleaving teeth 41, 51.

Such a conventional construction or arrangement suffers from the disadvantage that the vibration of the terminal holder 3 during the operation of the motor tends to loosen and even sever the connections between the terminal clips 31, 32 and the lead wires 6, 7 and stator coil ends 21, 22. Attempts have been made to solve this problem by molding or encapsulating the connections between the coil ends and the lead wires in resin, but this has resulted in short circuiting problems due to the very delicate and flexible nature of the thin coil ends and lead wires and their attendant tendency to migrate against one another during the high throughput rate molding process or to become exposed at the surface of the molding resin.

SUMMARY OF THE INVENTION

These drawbacks and disadvantages of the conventional stator coil assembly are effectively overcome in accordance with the present invention by fixedly securing elongate, axially oriented terminal plates between the bobbin flanges and overlying the stator coil during their encapsulation with molding resin. Such securement is implemented by providing a snap retention element on one end of each terminal plate which is inserted into and cooperates with an associated aperture in one of the bobbin flanges. The opposite end of each terminal plate, or the proximate portion of a lead wire secured thereto, is pushed into a clamping recess in the other bobbin flange.

BRIEF DESCRIPTION OF THE DRAWINGS

FIG. 4 is an end elevation of the coil assembly shown in FIG. 3, FIG. 5 is a sectional elevation taken on line V—V of FIG. 4, and FIG. 6, FIG. 7 and FIG. 8 are sectional elevations, similar to FIG. 5, showing alternate embodiments of the invention.

DETAILED DESCRIPTION OF THE PREFERRED EMBODIMENTS

Figure 3:
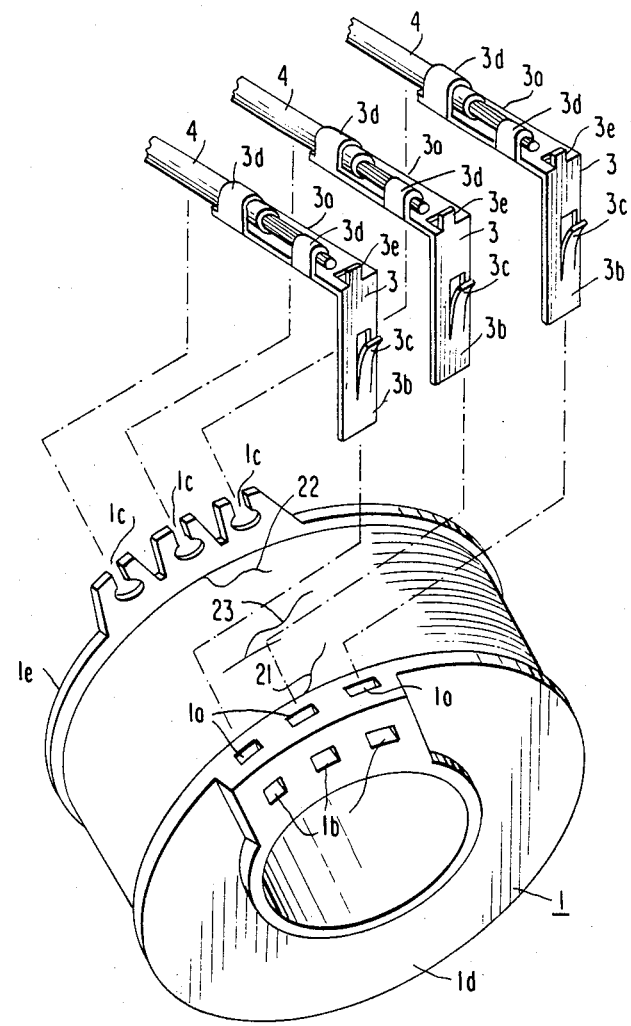
FIG. 3 is an exploded perspective view of a stator coil and connection terminal assembly according to a first embodiment of the invention.

Referring to the embodiment shown in FIGS. 3-5, a molded resin winding spool or bobbin 1 is provided with flanges 1d and 1e at its opposite ends. A thickened portion of the flange 1d has three inwardly extending apertures 1a, either radially oriented or parallel to each other, and three further, axially directed apertures 1b extending completely through the flange or terminating at their intersections with the apertures 1a. The flange 1e on the opposite end of the bobbin is formed with an outwardly extending sector or segment defining three spaced push-clamp recesses 1c oriented axially opposite the apertures 1a. The split or center tapped stator coil 2 wound around the bobbin has three connection leads or wire ends 21, 22, 23.

The assembly further comprises three L-shaped terminal plates 3 having axial arms 3a, to which lead wires 4 are secured by pinch or squeeze clamps 3d. The radial arms 3b of the terminal plates are provided with outwardly bent spring flukes 3c and upstanding posts or projections 3e to which the respective stator coil leads 21, 22, 23 are connected by soldering or the like.

Figure 1:
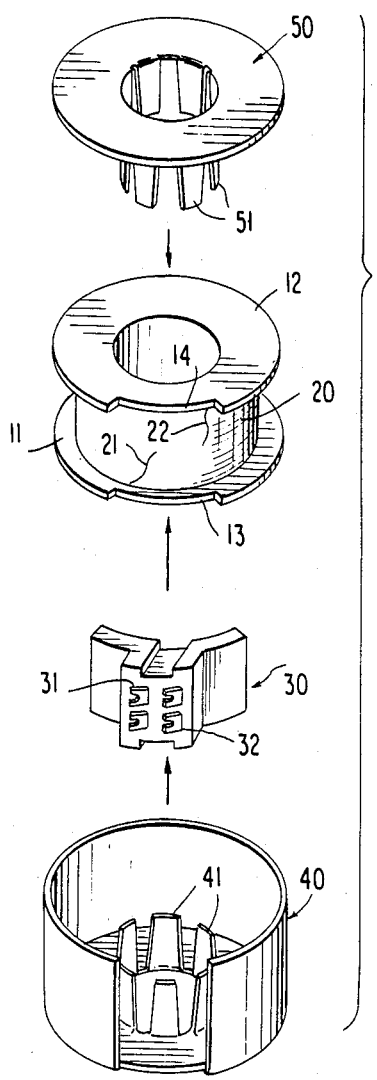
FIG. 1 is an exploded perspective view of a conventional stator coil and connection terminal assembly.
Figure 2:
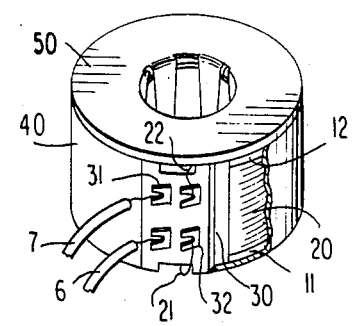
FIG. 2 is a perspective view showing the components of FIG. 1 in an assembled state.

During assembly the radial arms 3b of the terminal plates are push inserted into the flange apertures 1a until their spring flukes 3c snap into engagement with the apertures 1b, the lead wires 4 are simultaneously pushed into the clamping recesses 1c in the opposite flange, the stator coil leads are soldered to the terminal plate posts 3e, and a potting or encapsulating resin 5 is molded around the outer circumference of the assembly. A stator core cup and cover (not shown) would then be applied to complete the assembly as shown in FIGS. 1 and 2. With such a construction the spring flukes 3c positively retain the terminal plates in their installed positions due to the snap engagement between the flukes and the apertures 1b, and the opposite ends of the plates are similarly retained in their fixed positions by the push insertion of the lead wires 4 into the clamping recesses 1c. The installed terminal plates and lead wires are thus firmly held in position during the resin molding process, and the inadvertent short circuiting contacts between the lead wires and/or their exposure at the surface of the molding resin 5, as experienced with the conventional assembly described above, are fully avoided.

In the modification shown in FIG. 6 the apertures 1b in the thickened portion of the end flange 1d for accommodating the spring flukes do not extend completely through the flange, but instead are in the form of blind bores or recesses terminating short of the outer end surface of the flange. In the modification shown in FIG. 7 the terminal plates are straight rather than L-shaped, i.e. the arms 3b are omitted, the ends of the plates extend through the axial apertures 1b rather than the radial apertures 1a, the spring flukes 3c snap engage the apertures 1a, the inner pinch clamps 3d also serve as connecting posts for the stator coil leads, and the outer pinch clamps instead of the lead wires are pushed into the flange recesses 1c. In the FIG. 8 embodiment the spring flukes 3c on the terminal plates are replaced by open apertures 3f which are snap engaged during insertion by saw tooth flukes 1f extending inwardly from the end flange 1d.

The center tapped or split stator coil could obviously be just a single coil having two lead wire ends as shown in the conventional stator assembly.

What is claimed is:

1. A stator coil assembly for an electric motor, comprising:
   (a) a bobbin having a central spool and first and second circular flanges (1d, 1e) on opposite ends of the spool,
   (b) a stator coil (2) wound on the bobbin and having at least two coil wire ends (21, 22),
   (c) at least two circumferentially spaced apertures means defined in a portion of the first flange, each aperture means comprising a first radially oriented aperture (1a) and a second axially oriented aperture (1b) intersecting the first aperture,
   (d) least two circumferentially spaced clamping recesses (1c) defined in a portion of the second flange in individual axial alignment with the aperture means,
   (e) at least two axially elongated terminal plates (3) having external lead wires (4) and the stator coil wire ends individually secured thereto,
   (f) one end of each terminal plate being inserted in an associated aperture means and cooperably defining therewith spring back, snap retention means (3c; 3f),
   (g) another, opposite end (3d) of each terminal, or a proximate portion of an associated lead wire (4) being retainingly inserted in and cooperable with an associated clamping recess such that each terminal plate is fixedly held in axial alignment with the bobbin, overlying the stator coil, and extending between the first and second flanges, and
   (h) an electrically insulating molding resin (5) encapsulating the terminal plates and the connections thereto of the lead wires and the coil wire ends.

2. A stator coil assembly according to claim 1, wherein:
   (a) said one end of each terminal plate includes a radially inwardly extending arm (3b),
   (b) each snap retention means comprises a spring fluke (3c) bent outwardly from an associated arm, and
   (c) each arm is inserted into an associated first aperture until its spring fluke snaps into retentive engagement with a second aperture.

3. A stator coil assembly according to claim 1, wherein:
   (a) said one end of each terminal plate includes a radially inwardly extending arm (3b),
   (b) each snap retention means comprises an open aperture (3f) in an associated arm cooperable with a resilient fluke (1f) extending inwardly from a bottom of a second aperture, and
   (c) each arm is inserted into an associated first aperture until its open aperture is retentively snap engaged by a resilient fluke.

4. A stator coil assembly according to claim 1, wherein:
   (a) each snap retention means comprises a spring fluke (3c) bent outwardly from said one end of an associated terminal plate, and
   (b) said one end of each terminal plate is inserted into an associated second aperture until its spring fluke snaps into retentive engagement with a first aperture.

* * * * *